United States Patent Office 2,828,330
Patented Mar. 25, 1958

2,828,330

PURIFICATION OF TEREPHTHALIC ACID ESTERS

Richard Sinn, Ludwigshafen (Rhine), Germany, assignor to Badische Anilin- & Soda-Fabrik Aktiengesellschaft, Ludwigshafen (Rhine), Germany No Drawing. Application March 4, 1955
Serial No. 492,303

Claims priority, application Germany March 6, 1954

4 Claims. (Cl. 260—475)

This invention relates to a new and improved method of purifying terephthalic acid esters.

In order to bring terephthalic acid esters, as for example the dimethyl ester, to the necessary purity for further processing, in particular as a raw material for spinning, the esters have hitherto either been recrystallized from solvents, as for example acetone, or distilled in vacuo or treated with extraction agents. These methods are, however, expensive and troublesome and lead only to insufficient purification.

Among the objects of the present invention are therefore provisions for an improved method for purifying terephthalic acid esters. While the principal object of this invention is the purification of terephthalic acid dimethyl esters, the invention is not limited to the purification of this ester but also deals with the purification of other esters like terephthalic acid diethyl or dipropyl ester or with other diesters of terephthalic acid and monohydric alcohols.

I have now found that terephthalic acid esters are obtained in a very pure form by mixing the ester vapor with the vapor of an auxiliary liquid of lower boiling point which does not react with the ester and which has low solvent action on the ester at room temperature but on the contrary readily dissolves the impurities at room temperature, then cooling the vapor mixture to a temperature at which not only the ester but at least also the bulk of the auxiliary liquid is condensed, and separating the terephthalic acid ester which has crystallized out from the auxiliary liquid.

Suitable auxiliary liquids are for example aliphatic or aromatic hydrocarbons, as for example hexane, heptane etc., or benzene, toluene, xylene etc., alcohols, as for example methanol, ethanol, propanol, butanols, ethylene glycol and other monohydric or polyhydric alcohols, ketones, as for example acetone, butanone, methyl-ethyl ketone, diethyl ketone, cyclohexanone, dioxane etc. Mixtures of the auxiliary liquids may also be used. These organic auxiliary liquids should preferably boil (at ordinary pressure) at a temperature below the melting point of the ester. The vapor of the auxiliary liquid is mixed at atmospheric, increased or reduced pressure with the ester vapor after heating to the temperature thereof.

For the production of the vapor mixture it is preferable to lead the vapor of the auxiliary liquid after it has been heated to the desired temperature over or through the molten ester. Care should be taken that no droplets of the crude ester are entrained with the vapor of the auxiliary liquid. The ester vapor may also be mixed directly with the vapor of the auxiliary liquid.

The resultant vapor mixture is condensed in a suitable condenser, as for example, a surface condenser, or by spraying into cold auxiliary liquid. The temperature of the walls of the condenser or of the sprayed-in auxiliary liquid is so adjusted that the ester and at least the bulk of the auxiliary liquid separate. The terephthalic acid ester precipitated in finely crystalline form is floated away from the cooler walls by the auxiliary liquid simultaneously condensed, and this can be enhanced by spraying in further auxiliary liquid. The ester is then separated from the auxiliary liquid by filtration or centrifuging and dried.

The purifying action can be improved by leading the vapor mixture before condensation over active carbon or another adsorbent, as silica gel, activated clays, and aluminum oxide, which retains part of the impurities.

If the ester contains contaminants which are of lower volatility than the ester, it is preferable to free the vapor mixture from the more difficultly volatile components in a fractionating column before the vapor mixture is cooled. In this column, a part of the condensed ester serves as reflux liquid. Its temperature should be kept higher than the melting point of the ester.

The auxiliary liquid separated from the ester can be returned to the purification process. Before this, it is preferably freed from the non-volatile impurities and the dissolved ester, for example in a vaporizer. If undesired components pass over with the vapor of the auxiliary liquid, these can be separated by an interposed fractionation device.

The following examples will further illustrate this invention but the invention is not restricted to these examples. The parts are by weight.

Example 1

100 parts of molten terephthalic acid dimethyl ester, which after re-esterification with ethylene glycol by condensation of the glycol ester gives products of a yellow-brown coloration, are heated in a distillation vessel to 160° C. Into the melt there is led the vapor of methanol which has been taken from a vapor generator and heated to 160° C. After flowing through a separator for entrained droplets of ester, the vapor mixture is condensed in a cooler. Besides methanol, terephthalic acid dimethyl ester is obtained in a pure crystallized form, which after re-esterification and condensation gives products of no appreciable coloration. The crystals are separated from methanol by suction filtration, and the methanol together with the dissolved impurities returned to the vapor generator from which it passes again into the purification apparatus leaving behind the impurities.

Example 2

100 parts of crude terephthalic acid dimethyl ester as used according to Example 1 are heated in a distillation vessel to 180° C. Into the ester melt there are led the vapors of 300 parts of methanol, produced in a vapor generator, and heated to 180° C. The methanol vapors saturated with terephthalic acid ester are caused to pass through a fractionating filter column in which a part of the condensed ester serves as reflux liquid. This causes the ester droplets entrained to be retained and any components having a boiling point higher than the ester to be separated by fractional distillation. Having passed an activated carbon filter, the vapor mixture is condensed in a cooler.

In addition to methanol, terephthalic acid dimethyl ester is obtained in a pure crystallized form. The crystals are filtered from methanol, 95 percent of terephthalic acid dimethyl ester being obtained. The methanol is recycled to the vapor generator together with the contaminants dissolved, from which it repasses to the purification plant without the contaminants. The pure ester, after re-esterification and condensation, gives products of no appreciable coloration.

I claim:

1. A process for purifying terephthalic acid esters which comprises the steps of mixing the vapor of a terephthalic acid ester with the vapor of methanol, cooling the vapor mixture to a temeprature at which the ester and the bulk of the methanol condense with separation of the terephthalic ester, and separating the terephthalic acid ester from the impurities which remain dissolved in the methanol.

2. The process as claimed in claim 1 wherein the vapor mixture, before cooling, is split up in a fractionation collum to remove contaminants of lower volatility than the ester.

3. The process as claimed in claim 1 wherein the solvent recovered from the vapor mixture by cooling is returned to the purification plant.

4. The process as claimed in claim 1, wherein the vapor mixture is led over activated carbon before the cooling.

References Cited in the file of this patent
UNITED STATES PATENTS

| | | |
|---|---|---|
| 1,864,893 | Crowell et al. | June 28, 1932 |
| 2,091,241 | Kvalnes | Aug. 24, 1937 |